United States Patent Office 3,553,206
Patented Jan. 5, 1971

---

3,553,206
7-LOWER ALKANOYL BENZODIAZEPINES
Pius Anton Wehrli, Verona, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 838,677, July 2, 1969. This application Nov. 17, 1969, Ser. No. 877,490
Int. Cl. C07d 53/06
U.S. Cl. 260—239
11 Claims

ABSTRACT OF THE DISCLOSURE

Benzodiazepines bearing a lower alkanoyl group in position-7 and processes for preparing the foregoing. Benzodiazepines bearing a lower alkanoyl group in position-7 are useful as an anticonvulsant, muscle relaxant and sedative agents.

---

This application is a continuation-in-part of application Ser. No. 838,677, filed July 2, 1969.

DETAILED DESCRIPTION OF THE INVENTION

The present invention relates to 7-lower alkanoyl-benzodiazepines of the formula

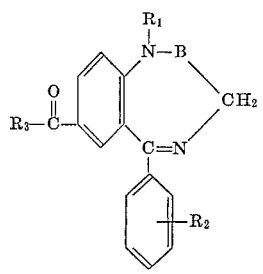

(I)

wherein B is selected from the group consisting of methylene (—$CH_2$—) and carbonyl

$R_1$ is selected from the group consisting of hydrogen and lower alkyl; $R_2$ is selected from the group consisting of hydrogen, halogen and nitro and $R_3$ is selected from the group consisting of hydrogen and lower alkyl.

By the term "lower alkyl" as utilized herein, there is intended both straight and branched chain $C_1$–$C_7$, preferably $C_1$–$C_4$ hydrocarbon groups such as methyl, ethyl, propyl, isopropyl, butyl and the like. By the term "halogen" as utilized herein, there is intended all four forms thereof, i.e., chlorine, bromine, fluorine and iodine. By the term "lower alkanoyl," as utilized herein, a "lower alkyl C=O" grouping is intended, e.g., acetyl, propionyl, butyryl and the like. Also as utilized herein, the term "lower alkanoyl" can connote the acyl moiety of formic acid (i.e., an HCO grouping). When $R_2$ is other than hydrogen, it is preferably joined in the 2-position of the 5-phenyl ring. However, compounds of the Formula I above wherein $R_2$ represents hydrogen and halogen are among the more preferred. When $R_2$ is halogen, it is preferentially fluorine. Also when $R_1$ and $R_3$ in Formula I above represents lower alkyl, a lower alkyl group containing up to four carbon atoms is preferred, most preferentially when the lower alkyl group is methyl. As is evident from the above, preferred are compounds which contain a methyl group as $R_1$, a methyl group as $R_3$ and/or $R_2$ as hydrogen or fluorine joined in the 2-position of the 5-phenyl ring.

Compounds of the Formula I can be prepared by treating the corresponding compound of the formula

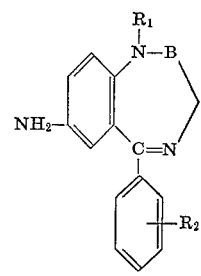

(II)

wherein B, $R_1$ and $R_2$ are as above, with nitrous acid to form a diazonium salt and then converting the resulting diazonium salt into the desired compound of the Formula I above. The formation of the diazonium salt is effected by first preparing a solution of a compound of the Formula II above in a dilute mineral acid such as aqueous sulfuric acid, aqueous hydrochloric acid and the like and then treating the so-prepared solution with nitrous acid. Conveniently, the nitrous acid is provided by adding to the said solution, an aqueous solution of an alkali metal nitrite, preferably, sodium nitrite. The nitrous acid treatment is preferably carried out at or below room temperature to avoid the reaction proceeding too energetically. Thus, temperatures between −5 to 25° C. are preferred.

The so-obtained diazonium salt is then treated with a lower alkanoyl group providing agent, preferably after neutralizing the reaction medium with a buffering agent such as sodium acetate, sodium carbonate and the like whereby to render the reaction medium less acidic. Any substance which is capable of reacting with the diazonium salt to subsequently permit the corresponding compound of the Formula I above to be generated is suitable for the purposes of the present invention. Representative of such substances are formaldehyde semicarbazone, lower alkyl aldehyde semicarbazones such as acetaldehyde semicarbazone, propionaldehyde semicarbazones and the like, oximes and derivatives thereof of the formula $$R_5\text{—CH=NOR}_6$$

wherein $R_5$ and $R_6$ are hydrogen or lower alkyl such as formaldoxime, propionaldoxime, the methyl ether of the latter and the like. However, preferred for this purpose is acetaldehyde semicarbazone.

The reaction of the lower alkanoyl group providing agent with the diazonium salt is effected preferably in the presence of finely divided copper or a cupric salt, e.g., $CuSO_4$, and results in an intermediate product of the formula

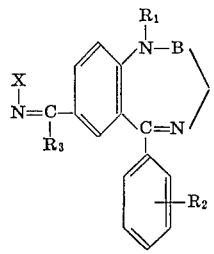

wherein X is selected from the group consisting of $OR_6$ and $NHCONH_2$ and $R_1$, B, $R_2$, $R_3$ and $R_6$ are as above.

The resulting intermediate is hydrolized with any suitable reagent to remove the grouping X to thereby effect the preparation of the corresponding compound of the Formula I. This is conveniently done by treating the intermediate with a dilute acid such as aqueous HCl, aqueous H₂SO₄, aqueous nitric acid and the like.

The reaction scheme in a preferred embodiment involves conversion of a compound of the Formula II above by diazotization into the diazonium salt thereof, treating the resulting diazonium salt with acetaldehyde semicarbazone, preferably in the presence of cupric sulfate, and then hydrolizing the resulting product with a dilute acid.

Compounds of the Formula I above wherein $R_1$ is hydrogen, can be converted into the corresponding compound of the Formula I above wherein $R_1$ is lower alkyl by conventional procedures. For example, compounds of the Formula I above wherein $R_1$ is hydrogen can be converted into its 1-sodio derivative with sodium methoxide, sodium hydride and the like and the resulting 1-sodio compound can then be alkylated utilizing conventional alkylating agents such as methyl iodide, ethyl iodide, dimethylsulfate and the like. Suitably, the alkylation is effected in the presence of any conveniently available inert organic solvent medium utilizing one or more inert organic solvents such as methanol, ethanol, dimethylformamide, benzene, toluene and N-methylpyrrolidine or the like.

Compounds of the Formula I wherein B is a methylene group, i.e., a compound of the formula

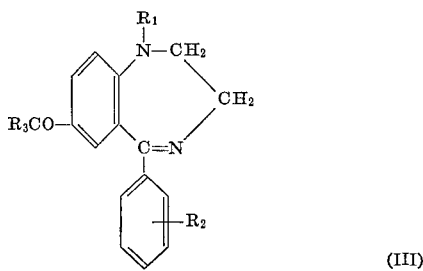

(III)

wherein $R_1$, $R_2$ and $R_3$ are as above, can be oxidized with ruthenium tetroxide into the corresponding compound of the Formula I above wherein B is carbonyl, i.e., a compound of the formula

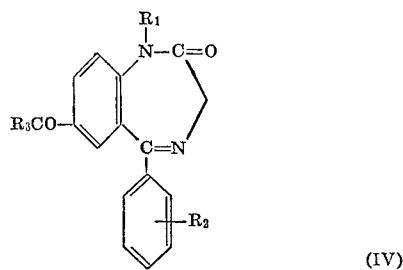

(IV)

wherein $R_1$, $R_2$ and $R_3$ are as above.

In a preferred aspect, ruthenium tetroxide is added in a molar excess to the reaction zone containing a compound of the Formula III. Preferably, the oxidation is effected at below room temperature, e.g., at a temperature range of from about −20° C. to about 15° C., most preferably from about 0° C. to about 10° C. The reaction proceeds most suitably in the presence of an inert organic solvent and among the many solvents suitable for the purposes of the present invention there may be included halogenated aliphatic hydrocarbons such as chloroform, carbontetrachloride, dichloromethane and the like.

Advantageously, after the oxidation reaction is permitted to proceed for the time necessary to effect the desired end, i.e., to a point where at a compound of the Formula IV is prepared from the corresponding compound of the Formula III, any suitable reagent may be added to the reaction medium to destroy any excess ruthenium tetroxide present therein. A preferred reagent for this purpose is a lower alkanol such as 2-propanol.

As is indicated above, the compounds of the Formula I (i.e., the 7-lower alkanoyl benzodiazepines of the Formula III and the 7-lower alkanoyl-benzodiazepin-2-ones of the Formula IV) are useful as anticonvulsants, muscle relaxants and sedatives. Such compounds can be formulated into pharmaceutical preparations in admixture with a compatible pharmaceutical carrier and can be administered enterally or parenterally with dosages fitted to suit the exergencies of a pharmacological situation.

For example, a compound of the Formula IV wherein $R_1$ and $R_3$ are both methyl and $R_2$ is hydrogen have demonstrated properties in the metrazole test with dosage levels about 12 mg./kg. A corresponding compound of the Formula III has demonstrated properties in the metrazole test with dosage levels about 25 mg./kg.

As contemplated by this invention, the novel compounds of the Formula I can be embodied in pharmacological dosage formulations containing from about 0.5 mg. to about 200 mg. of active substance, with dosage adjusted to species and individual requirements. (Parenteral formulations would ordinarily contain less of the active substance than compositions intended for oral administrations.) The novel compounds of this invention can be administered alone or in combination with pharmaceutical acceptable carriers as indicated above in a wide variety of dosage forms.

For example, solid preparations for oral administration can include tablets, capsules, powders, granules, emulsions, suspensions and the like. The solid preparations may comprise an inorganic carrier, e.g., talc, or an organic carrier, e.g., lactose, starch. Additives such as magnesium stearate (a lubricant) can also be included. Liquid preparations such as solutions, suspensions or emulsions may comprise the usual diluents such as water, petroleum jelly and the like, a suspension media such as polyoxyethylene glycols, vegetable oils and the like. They may also contain other additional ingredients such as preserving agents, stabilizing agents, wetting agents, salts for varying the asmotic pressure or buffers. They may also contain, in combination, other therapeutically useful substances.

The following examples are illustrative but not limitative of the present invention. All temperatures are stated in degrees centigrade.

EXAMPLE 1

Preparation of 7-acetyl-2,3-dihydro-1-methyl-5-phenyl-1H-1,4-benzodiazepine 51.4 g. (0.2 m.) of 7-amino-2,3-dihydro-1-methyl-5-phenyl-1H-1,4-benzodiazepin dihydrochloride was treated with 40 g. (ea. 0.4 m.) of con. H₂SO₄ in 260 cc. of water with ice salt bath cooling. A cooled aqueous solution containing 14 g. (0.202 m.) sodium nitrite in 30 cc. of water was added dropwise (stirring) over a period of 10 minutes. (Reaction temperature rose from −3° to 5°.) Stirring was continued with cooling for 30 minutes after completion of addition of the sodium nitrite solution. A solution of 18 g. anh. NaOAc in 50 cc. H₂O was then added. To the ice cold resulting reaction mixture, there was carefully added with vigorous stirring a suspension prepared utilizing 93 g. (0.93 m.) acetaldehyde semicarbazone, 65 g. anh. NaOAc, 10 g. CuSO₄·5H₂O and 900 cc. H₂O. The reaction temperature was maintained at 22-25° throughout the addition. Time of addition was 2½ hours. Ether was added from time to time to help control foaming which occured. After addition of the suspension, it was stirred for additional 2½ hours.

The reaction mixture was made strongly basic with 40% aqueous NaOH and extracted with $CH_2Cl_2$. The organic phase was washed with $H_2O$, dried over anhydrous $Na_2SO_4$ and evaporated to dryness leaving a residue containing 2,3 - dihydro-1-methyl-7-acetyl-5-phenyl-1H-1,4-benzodiazepine semicarbazone. 500 cc. of con. HCl was added to the residue and the mixture was refluxed for one hour, cooled, basified with 40% aq. NaOH and extracted with $CH_2Cl_2$. The organic phase was dried over anh. $Na_2SO_4$ and concentrated. The residue was redissolved in a small amount of $CH_2Cl_2$ and poured onto a sintered glass funnel containing silica gel suspended in $CH_2Cl_2$. It was then washed through with 2 liters of EtOAc. Concentration of the EtOAc washing afforded a thick dark residue. A column was prepared using 425 g. silica gel (0.05–0.2 mm. Merck for column chromatograph). The silica gel was slurred in EtOAc. The residue in a small amount of $CH_2Cl_2$ was placed on the column and washed through with EtOAc. (300 cc. fractions were collected.) The fractions were concentrated and combined, yielding 7-acetyl-2,3-dihydro-1-methyl - 5 - phenyl - 1H - 1,4-benzodiazepine in the residue (as determined by TLC). Recrystallization from $CH_2Cl_2$-Pet. $Et_2O$ gave 2 crops, which were dried at 63°/high vac. overnight, M.P. 109–113°.

EXAMPLE 2

Preparation of 7-acetyl-1,3-dihydro-1-methyl-5-phenyl-2H-1,4-benzodiazepin-2-one The ice-cold solution containing 75.7 ml. (0.0048 m.) of 0.0634 N $RuO_4$ in $CHCl_3$ was added dropwise over a period of 40 minutes to the solution of 1.23 g. (0.0044 m.) 7-acetyl - 2,3 - dihydro - 1 - methyl-5-phenyl-1H-1,4-benzodiazepine in 25 cc. $CCl_4$ with ice-bath cooling. The reaction mixture was stirred for 45 minutes after the completion of addition. 1 cc. of $H_2O$ was then added and the mixture was filtered through a Celite pad. The upper $H_2O$ phase was pipetted off and the organic phase was dried over anhydrous $Na_2SO_4$ and concentrated to a pale yellow viscous residue. The residue was dissolved in ether and yielding a precipitate. Recrystallization from $$CH_2Cl_2 \cdot Et_2O$$

(pulling through Celite again to remove traces of $RuO_4$) afforded off-white prisms of 7 - acetyl - 1,3 - dihydro - 1-methyl - 5 - phenyl-2H-1,4-benzodiazepin - 2 - one, M.P. 120–5°.

EXAMPLE 3

In a similar manner to the procedures found in Example 1, 7-propionyl-2,3-dihydro-1-methyl-5-phenyl - 1H-1,4-benzodiazepine can be prepared via the reaction of 7 - amino - 2,3 - dihydro - 1 - methyl - 5 - phenyl - 1H-1,4-benzodiazepine dihydrochloride and propionaldehyde semicarbazone to obtain 2,3-dihydro-1-methyl - 7 - propionyl-5-phenyl-1H - 1,4 - benzodiazepine semicarbazone which can be hydrolized to 7-propionyl - 2,3 - dihydro-1-methyl - 5 - phenyl-1H-1,4-benzodiazepine. The last-mentioned compound can then be oxidized by the procedure described in Example 2 to 7-propionyl - 1,3 - dihydro-1-methyl-5-phenyl-2H-1,4-benzodiazepin-2-one.

EXAMPLE 4

In a similar manner to that described in Example 1 starting with 7 - amino - 2,3 - dihydro - 1 - methyl - 5-phenyl-1H-1,4-benzodiazepine dihydrochloride and butyraldehyde semicarbazone, there can be prepared 2,3-dihydro - 1 - methyl - 7 - butyryl - 5 - phenyl - 1H - 1,4-benzodiazepine semicarbazone which can be converted by the procedures described in Example 1 to 7-butyryl-2,3-dihydro - 1 - methyl - 5 - phenyl - 1H - 1,4 - benzodiazepine. The so-obtained last-mentioned compound can be oxidized with $RuO_4$ as described in Example 2 to 7-butyryl - 1,3 - dihydro - 1 - methyl - 5 - phenyl - 2H-1,4-benzodiazepin-2-one.

EXAMPLE 5

A tablet formulation containing the following ingredients.

| Ingredients: | Mg./tablet |
| --- | --- |
| 7 - acetyl - 1,3 - dihydro - 1 - methyl-5-phenyl-2H-1,4-benzodiazepin-2-one | 25.0 |
| Lactose | 98.0 |
| Corn starch | 61.0 |
| Corn starch as 10% paste | 5.0 |
| Talcum | 4.5 |
| Magnesium stearate | 1.5 |
| Corn starch | 5.0 |
| Tablet weight | 200.0 | was prepared as follows:

(1) Mix the 7-acetyl-1,3-dihydro-1-methyl - 5 - phenyl-2H-1,4-benzodiazepin-2-one, lactose and corn starch in a suitable mixing container and add the starch paste slowly to achieve a heavy, moist mass.

(2) Pass this moist mass through a #10 mesh screen (or similar suitable coarse screen).

(3) Place the moist granules on drying pans and dry at 110° F.

(4) Pass the dried granules through a #16 mesh screen, place in a suitable mixing container and add the talcum magnesium stearate and second portion of corn starch.

(5) Mix well and compress into tablet on either a single or multiple tabletting machine to an individual tablet weight of 200 mgs. An $^{11}\!/_{32}''$ standard concave scored punch is suitable, yielding tablets with a thickness of approximately 3.35 mm.

EXAMPLE 6

A capsule formulation containing the following ingredients

| Ingredients: | Per capsule, mg. |
| --- | --- |
| 7-acetyl-1,3-dihydro-1-methyl-5-phenyl-2H-1,4 benzodiazepin-2-one | 10 |
| Lactose, U.S.P. | 165 |
| Corn starch, U.S.P. | 30 |
| Talc, U.S.P. | 5 |
| Total weight | 210 | was prepared as follows:

(1) 7-acetyl - 1,3 - dihydro-1-methyl-5-phenyl-2H-1,4-benzodiazepin-2-one, lactose and corn starch were mixed in a suitable mixer.

(2) The mixture was further blended by passing through Fitzpatrick Comminuting Machine with a #1A screen with knives forward.

(3) The blended powder was returned to the mixer, the talc added and blended thoroughly.

(4) The mixture was filled into #4 hard shell gelatin capsules on a Parke Davis capsulating machine. (Any similar type capsulating machine may be used.)

EXAMPLE 7

A parenteral formulation containing the following ingredients

| Ingredients: | | Per cc. |
| --- | --- | --- |
| 7 - acetyl - 1,3 - dihydro - 1 - methyl - 5 - phenyl-2H-1,4-benzodiazepin-2-one | mg | 5.0 |
| Propylene glycol | cc | 0.4 |
| Benzyl alcohol (benzaldehyde free) | cc | 0.015 |
| Ethanol 95% U.S.P. | cc | 0.10 |
| Sodium benzoate | mg | 48.8 |
| Benzoic acid | mg | 1.2 |
| Water for injection q.s. | cc | 1.0 | were prepared (for 10,000 cc.) as follows:

(1) 50 grams of 7-acetyl-1,3-dihydro-1-methyl-5-phenyl-2H-1,4-benzodiazepin-2-one were dissolved in 150 cc.

of benzyl alcohol; 4,000 cc. of propylene glycol and 1,000 cc. of ethanol were added.

(2) 12 grams of benzoic acid were dissolved in the above. The 48.8 grams of sodium benzoate dissolved in 3,000 cc. of water for injection were added. The solution was brought up to final volume of 10,000 cc. with water for injection.

(3) The solution was filtered through an 02 Selas candle, filled into suitable size ampuls, gassed with $N_2$ and sealed. It was then autoclaved at 10 p.s.i. for 30 minutes.

We claim:

1. A compound of the formula

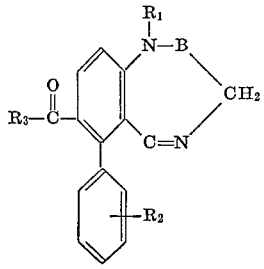

wherein B is selected from the group consisting of methylene and carbonyl; $R_1$ and $R_3$ are selected from the group consisting of hydrogen and lower alkyl and $R_2$ is selected from the group consisting of hydrogen and halogen.

2. A compound as in claim 1 wherein $R_3$ is methyl.
3. A compound as in claim 1 wherein $R_1$ is methyl.
4. A compound as in claim 3 wherein $R_3$ is methyl.
5. A compound as defined in claim 1 wherein $R_2$ is halogen and is joined to the 2-position of the 5-phenyl ring.
6. A compound as in claim 5 wherein $R_2$ is fluorine.
7. A compound as in claim 1 wherein $R_1$ and $R_3$ are methyl and $R_2$ is joined to the 2-position of the phenyl ring and is fluorine.
8. A compound as in claim 1 of the formula 7-acetyl-2,3-dihydro-1-methyl-5-phenyl-1H-1,4-benzodiazepine.
9. A compound as in claim 1 of the formula 7-acetyl-1,3 - dihydro-1-methyl-5-phenyl-2H-1,4-benzodiazepin-2-one.
10. A compound of the formula

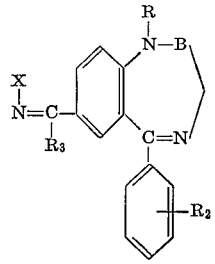

wherein X is selected from the group consisting of $OR_6$ and $NHCONH_2$; B is selected from the group consisting of methylene and carbonyl; $R_1$, $R_3$ and $R_6$ are selected from the group consisting of hydrogen and lower alkyl and $R_2$ is selected from the group consisting of hydrogen and halogen.

11. A compound as in claim 10 of the formula 2,3-dihydro-1-methyl-7-acetyl-5-phenyl-1H-1,4 - benzodiazepine semicarbazone.

References Cited

UNITED STATES PATENTS 3,136,815   6/1964   Reeder et al. _____ 260—239.3

JOHN D. RANDOLPH, Primary Examiner

R. T. BOND, Assistant Examiner

U.S. Cl. X.R.

260—239.3; 424—244